(12) United States Patent
Panarisi et al.

(10) Patent No.: US 11,399,558 B2
(45) Date of Patent: Aug. 2, 2022

(54) REBAUDIOSIDE-D CONTAINING SWEETENER COMPOSITIONS

(71) Applicant: Heartland Consumer Products, LLC

(72) Inventors: Joseph Panarisi, Manalapan, NJ (US); Jacob Paul Jae, Parsippany, NJ (US); Roma Vazirani, East Brunswick, NJ (US)

(73) Assignee: Heartland Consumer Products LLC, Carmel, IN (US)

( * ) Notice: Subject to any disclaimer, the term of this patent is extended or adjusted under 35 U.S.C. 154(b) by 0 days.

(21) Appl. No.: 15/059,868

(22) Filed: Mar. 3, 2016

(65) Prior Publication Data

US 2016/0255868 A1 Sep. 8, 2016

Related U.S. Application Data

(60) Provisional application No. 62/127,480, filed on Mar. 3, 2015.

(51) Int. Cl.
  *A23L 27/30* (2016.01)
  *A23L 27/00* (2016.01)

(52) U.S. Cl.
  CPC .............. *A23L 27/33* (2016.08); *A23L 27/34* (2016.08); *A23L 27/36* (2016.08); *A23L 27/70* (2016.08); *A23V 2002/00* (2013.01)

(58) Field of Classification Search
  CPC .......... A23L 27/33; A23L 27/70; A23L 27/34; A23L 27/36
  USPC ....................................................... 426/656
  See application file for complete search history.

(56) References Cited

U.S. PATENT DOCUMENTS

| | | |
|---|---|---|
| 4,612,942 A | 9/1986 | Dobberstein et al. |
| 4,886,677 A | 12/1989 | Kondou |
| 5,080,916 A | 1/1992 | Kondou |
| 6,030,820 A | 2/2000 | Morioka et al. |
| 6,475,552 B1 | 11/2002 | Shah et al. |
| 6,559,302 B1 | 5/2003 | Shah |
| 6,875,460 B2 | 4/2005 | Cunningham et al. |
| 8,277,862 B2 | 10/2012 | Lee et al. |
| 8,404,297 B2 | 3/2013 | Arango Moreno |
| 8,414,950 B2 | 4/2013 | Abelyan et al. |
| 8,591,980 B2 | 11/2013 | Markosyan et al. |
| 8,789,730 B2 | 7/2014 | Mroczka |
| 2006/0263423 A1 | 11/2006 | Norman et al. |
| 2007/0026121 A1 | 2/2007 | Benedict et al. |
| 2007/0116828 A1* | 5/2007 | Prakash ................ A23L 33/175 426/548 |
| 2009/0004355 A1 | 1/2009 | Catani |
| 2009/0011104 A1 | 1/2009 | Catani |
| 2009/0017185 A1 | 1/2009 | Catani |
| 2009/0104326 A1 | 4/2009 | Catani |
| 2010/0222311 A1 | 9/2010 | Thommes et al. |
| 2010/0285201 A1 | 11/2010 | Catani |
| 2010/0316782 A1 | 12/2010 | Shi |
| 2011/0183056 A1 | 7/2011 | Morita |
| 2012/0104326 A1 | 5/2012 | Song et al. |
| 2012/0201940 A1 | 8/2012 | Catani |
| 2012/0201952 A1 | 8/2012 | Catani |
| 2013/0251881 A1† | 9/2013 | Mutilangi |
| 2013/0309389 A1† | 11/2013 | Carlson |
| 2014/0004248 A1 | 1/2014 | Zhang et al. |
| 2014/0243514 A1 | 8/2014 | Brower III et al. |
| 2014/0335253 A1 | 11/2014 | Shi et al. |
| 2014/0335254 A1 | 11/2014 | Shi et al. |
| 2014/0335264 A1 | 11/2014 | Shi et al. |
| 2014/0335265 A1 | 11/2014 | Shi et al. |
| 2014/0342044 A1 | 11/2014 | Bell et al. |
| 2014/0377436 A1 | 12/2014 | Persinger |
| 2015/0030547 A1 | 1/2015 | Liao et al. |
| 2015/0257424 A1 | 9/2015 | Catani et al. |

FOREIGN PATENT DOCUMENTS

| | | | |
|---|---|---|---|
| EP | 2708548 A2 | | 3/2014 |
| WO | 2011046423 A1 | † | 4/2011 |

OTHER PUBLICATIONS

Dailey, Pat "No Differene Between Losse Sugar and Cubes" Chicago Tribune pp. 1-2, Nov. 1991 https://www.chicagotribune.com/news/ct-xpm-1991-11-07-9104100279-story.html.*
Engel, Joshua "How do you get sugar to stay in sugar cube form" Apr. 2011 p. 1 https://www.quora.com/How-do-you-get-sugar-to-stay-in-sugar-cube-form.*
Phillips, K.C., Stevia: Steps in Developing a New Sweetener, in Grenby T.H. ed. Developments in Sweeteners 1989, vol. 3, Elsevier Applied Science, London, pp. 1-43.
Zimmerman, B.F., Tandem Mass Spectrometric Fragmentation Patterns of Known and New Steviol Glycosides with Structure Proposals, Rapid Commun. Mass Spectrom. 2011, vol. 25, pp. 1575-1582.
Richman, A.S., et al., "Diterpene Synthesis in Stevia Rebaudiana: Recruitment and Up-Regulation of Key Enzymes from the Gibberellin Biosynthetic Pathway," The Plant Journal 1999, vol. 19(4), pp. 411-421.
Brandle, J.E., et al., "Leaf ESTs from Stevia Rebaudiana: A Resource for Gene Discovery in Diterpene Synthesis," Plant Molecular Biology, Nov. 2002, vol. 50, Issue 4, pp. 613-622.
Hynes, R.C., et al., "Sucrose, A Convenient Test Crystal for Absolute Structures," Journal of Applied Crystallography 1991, vol. 24(4), 15 pgs.
Beevers, C.A., et al., The Crystal Structure of Sucrose, Acta Cryst. (1952) vol. 5, pp. 689-690.

(Continued)

*Primary Examiner* — Jyoti Chawla
(74) *Attorney, Agent, or Firm* — Taft Stettinius & Hollister LLP; Joseph M. Bennett-Paris (57) ABSTRACT

A rebaudioside D containing sweetening composition exhibiting taste like sugar containing a carrier and rebaudioside D is disclosed. A method of making the rebaudioside D containing sweetening composition; and a method of using the rebaudioside D containing sweetening composition are also disclosed.

9 Claims, 2 Drawing Sheets

(56) References Cited

OTHER PUBLICATIONS

Wolwer-Rieck, Ursula, "The Leaves of Stevia Rebaudiana (Bertoni), Their Constituents and the Analyses Thereof: A Review," Journal of Agricultural and Food Chemistry 2012, vol. 60, pp. 886-895.
Chang, Shin S., et al., "Stability Studies of Stevioside and Rebaudioside A in Carbonated Beverages," Journal of Agricultural and Food Chemistry 1983, vol. 31(2), pp. 409-412.
Prakash, G.E., et al., "Development of Rebiana, a Natural, Non-Caloric Sweetener," Food and Chemical Toxicology 2008, vol. 46, pp. S75-S82.
Tanaka, Osamu, "Improvement of Taste of Natural Sweeteners," Pure & Appl. Chem. 1997, vol. 69, No. 4, pp. 675-683.
Richman, Alex, et al., "Functional Genomics Uncovers Three Glucosyltransferases Involved in the Synthesis of the Major Sweet Glucosides of Stevia Rebaudiana," The Plant Journal 2005, vol. 41, pp. 56-67.
Ohta, Masaya, et al., Characterization of Novel Steviol Glycosides from Leaves of Stevia Rebaudiana Morita, J. Appl. Glycosci. 2010, vol. 57, pp. 199-209.

\* cited by examiner
† cited by third party

Figure 1

SPI Polyols, Inc.
POLYOLS COMPARISON CHART

| Raw Material | % Relative Sweetness vs. Sucrose | Calorie Content (Kcal/g) USA | Calorie Content (Kcal/g) Canada | Calorie Content (Kcal/g) Japan | Laxation Threshold (g/day) | Solubility at 25°C (g/100g H₂O) | Heat of Solution (cal/g) | Melting Point (°C) | Degree of Hygroscopicity %ERH @20°C | Molecular Weight | GRAS USA | Canada |
|---|---|---|---|---|---|---|---|---|---|---|---|---|
| Sorbitol | 60 | 2.6 | 2.6 | 3 | 50 | 235g | -26.5 | 99-101 | Medium | 182 | Yes | Yes* |
| Mannitol | 50 | 1.6 | 1.6 | 2 | 20 | 22g | -28.9 | 165-169 | Very Low | 182 | Food Additive | Yes* |
| HSH | 30-40 | 3`` | 3 | 2.3-3.4 | 70-140 | Soluble | n/a | n/a | Medium | HP+ | Yes[1] | Yes* |
| Maltitol Solution | 70-80 | 3`` | 3 | 2.3-3.4 | 70-80 | Soluble | n/a | n/a | Medium | HP+ | Yes[1] | Yes* |
| Maltitol | 90 | 2.1 | 3 | 2 | 100 | 175g | -5.5 | 144-147 | Low | 344 | Yes[1] | Yes* |
| Xylitol | 100 | 2.4 | 3 | 3 | 50 | 200g | -36.5 | 92-95 | High | 152.17 | Food Additive | Yes* |
| Lactitol Monohydrate | 30-40 | 2 | 2 | 2 | 20-50 | 140g | -13.9 | 95-101 | Low | 362.33 | Yes[1] | Yes* |
| Anhydrous Isomalt | 40 | 2 | 2 | 2 | 50 | 39g | -9.4 | 145-150 | Very Low | 344.32 | Yes[1] | Yes |
| Erythritol | 60-70 | 0.2 | 2.6 | 0 | High | 61g | -42.9 | 119-123 | Very Low | 122 | Yes[1] | Pending |
| Glycerin | 55-75 | 4.3 | 4.3 | - | High | Soluble | +16.0 | 17.8 | Medium | 99 | Yes | Yes |
| Polydextrose | 0 | 1 | 1 | 1 | 90 | 80g | +9.0 | 130 | High | <22,000 | Food Additive | Yes* |
| Sucrose | 100 | 4 | 4 | 4 | None | 185g | -4.3 | 160-186 | Low | 342 | Yes | Yes |
| Fructose | 117 | 4 | 4 | 4 | None | 400g | -8.0 | 102-105 | High | 180 | Yes | Yes |
| Maltose | 30 | 4 | 4 | 4 | None | 70g | -8.0 | 120-125 | Medium | 342 | Food | Food |

*Extended to Use in Unstandardized Food
`` Based on solids
[1] Self-Affirmed GRAS Supplied courtesy of SPI Polyols, Inc., 321 Cherry Lane, New Castle, DE 19720, Phone 1-800-789-9755

*The information and recommendations in this publication are, to the best of the seller's knowledge, accurate. However, because of numerous factors affecting test results, seller makes no warranty of any kind, express or implied, other than the product conforms to its applicable current standards, Specifications (obtainable from our New Castle, DE Offices). Statements concerning the use of the products or formulations described herein are not to be construed as recommending the infringement of any patent.*

Figure 2

Plough Blender Process

REBAUDIOSIDE-D CONTAINING SWEETENER COMPOSITIONS

FIELD OF THE INVENTION

The present invention relates to rebaudioside D containing sweetener compositions that exhibit desirable sensory characteristics. The present invention also relates to a process for manufacturing the rebaudioside D containing sweetener compositions and to methods of using the rebaudioside D containing sweetener compositions in consumer products such as table top sweetener products, food ingredient products and over the counter (OTC) pharmaceutical dosage forms.

BACKGROUND OF THE INVENTION

People often customize the taste of food and beverages by adding sweeteners thereto. Sweetening food or beverages with a tabletop sweetener alters its flavor and increases its appeal. Although this behavior is found in all cultures, it is especially prevalent in western cultures.

Personal taste creates considerable variability in the amount of sweetness that one person prefers in a given food or beverage versus another person. For example, the amount of sweetness incorporated into a foodstuff during commercial production may not be adequate to satisfy some consumers while other consumers may find the same amount of sweetness to be excessive. Moreover, consumers often desire to reduce their caloric intake for health or lifestyle reasons. There therefore exists a need for sweetener products that consumers may use that are consistent with their personal preferences and minimize additional caloric burden.

Tabletop sweeteners are the primary vehicle by which such taste customization is accomplished. Many types of sweeteners are used as tabletop sweeteners. These include simple sugars, e.g., sucrose, fructose, and ketose; complex sweeteners, e.g., honey, molasses, and agave nectar; and high intensity sweeteners, e.g., sucralose, saccharine, and aspartame. Tabletop sweeteners are presently available in many different forms, including, liquid, granular, cohesive non-free flowing compositions (e.g., cubes and tablets), and the like.

Sweeteners have also been added to pharmaceuticals in order to make them more palatable and to mask the unpleasant taste often associated them.

Sucrose

Sucrose, commonly named table sugar or sugar, is cane and beet sugar. The molecule is a disaccharide combination of the monosaccharides glucose and fructose with the formula $C_{12}H_{22}O_{11}$. A white, odorless, crystalline powder with a sweet taste, it is best known for its role in food. About 175 million metric tons of sucrose sugar was produced worldwide in 2013.

In sucrose, the components glucose and fructose are linked via an ether bond between $C_1$ on the glucosyl subunit and $C_2$ on the fructosyl unit. The bond is called a glycosidic linkage. Glucose exists predominantly as two isomeric "pyranoses" ($\alpha$ and $\beta$), but only one of these forms links to the fructose. Fructose itself exists as a mixture of "furanoses", each of which having $\alpha$ and $\beta$ isomers, but only one particular isomer links to the glucosyl unit. What is notable about sucrose is that, unlike most disaccharides, the glycosidic bond is formed between the reducing ends of both glucose and fructose, and not between the reducing end of one and the nonreducing end of the other. This linkage inhibits further bonding to other saccharide units. Since it contains no anomeric hydroxyl groups, it is classified as a non-reducing sugar.

Sucrose crystallizes in the monoclinic space group P21 with room-temperature lattice parameters a=1.08631 nm, b=0.87044 nm, c=0.77624 nm, $\beta$=102.938°. Beevers, C. A.; McDonald, T. R. R.; Robertson, J. H. and Stern, F. (1952). "The crystal structure of sucrose." Acta Cryst 5 (5): 689-690. doi:10.1107/50365110X52001908 (http://dx.doi.org/10.1107%2FS0365110X52001908). Hynes, R. C.; Le Page, Y. (1991). "Sucrose, a convenient test crystal for absolute structures." Journal of Applied Crystallography 24 (4): 352. doi:10.1107/S0021889891002492 (http://dx.doi.org/10.1107%2FS0021889891002492).

Erythritol

Erythritol is a natural, low calorie sweetener. It has a bright, sweet taste that is about 70% the sweetness of sucrose (cane sugar) on a weight basis. It is found in grapes and other fruits and can be produced in large quantities by fermentation from sugar. It contains less than 0.2 kcals per gram and provides the equivalent of a teaspoon of sugar for around 1.2 kcals. While the caloric content is not as low as high intensity sweeteners, it compares very favorably with sucrose (about 16 kcals/tsp), fructose (about 14 Kcal/tsp SES), and tagatose (about 6.6 kcals/tsp SES) for those seeking to reduce calories.

Erythritol, which is a 4-carbon polyol, and which is also known as 1,2,3,4-butanetetrol, meso-erythritol, erythrol, erythrite, paycite, antierythrite, and phycitol (ChemIDPlus, 2010), has a molecular formula of $C_4H_{10}O_4$ and a molecular weight of 122.12 daltons. The chemical structure of erythritol is given below.

Erythritol is heat stable, non-hygroscopic, and exists as a white, odorless crystal. A summary of the physical and chemical properties of erythritol is presented in Table 1 below.

TABLE 1

| Generic Name | Eryrithritol |
|---|---|
| Formal (IUPAC) Name | 1,23,4-butanetetrol |
| CAS Registry No. | 149-32-6 |
| Molecular formula | $C_4H_{10}O_4$ |
| Molecular Weight | 122.12 daltons |
| Melting Point | 118-120° C. |
| Boiling Point | 329-331° C. |
| Solubility in water | Soluble |
| Solubility in ethanol | Slight |

TABLE 1-continued

| Solubility in DMSO | Insoluble |
|---|---|
| Color | White |
| Odor | Odorless |
| Taste | Sweet |
| Form | Crystal |

*O'Laughlin Biotech Company GRAS Notification for Erythritol (2011).

Erythritol has well-known characteristics which can be utilized for its identification. Erythritol is known to be stable under heat, acid, and alkaline conditions. Erythritol is water soluble and is slightly soluble in alcohol.

Other food grade crystals that are water-soluble, crystalline and have melting points below 200° C. can be employed in accordance with the invention. For example, sorbitol (mp at 99° C.-101° C.); mannitol (mp at 165° C.-169° C.); maltitol (mp at 144° C.-147° C.), xylitol (mp at 92° C.-95° C.); polydextrose (mp at 130° C.); sucrose (mp at 160° C.-186° C.); maltose (mp at 120° C.-125° C.). Additional polyols that may be used in accordance with the invention are listed in SPI Polyols, Inc. Polyols Comparison Chart shown in FIG. 1.

U.S. Published Patent Application No. 20060263423 to SPI Pharma, Inc. discloses a method for preparing highly compactible carbohydrate comprising blending a first carbohydrate and a second carbohydrate, the first carbohydrate has a melting point higher than the second carbohydrate; melting the second carbohydrate over the first carbohydrate to obtain a highly compacted product, drying the product, and screening the product to desired particle size. The reference discloses that erythritol may be used as one of the carbohydrates.

U.S. Published Patent Application No. 20070026121 to Benedict et al. discloses a sweetening composition having a crystalline matrix that contains a first material and a second material. The reference discloses that the first material may be erythritol and that the second material may be sucralose.

U.S. Published Patent Application No. 20100222311 to Purdue Research Foundation discloses pharmaceutical compositions that contain a solid suspension comprising an active pharmaceutical ingredient and a pharmaceutically acceptable water soluble solid additive, wherein at least a portion of the active pharmaceutical ingredient and a portion of the pharmaceutically acceptable water soluble solid additive are present as crystals in the solid suspension. The reference discloses that erythritol and malic acid are suitable water soluble solid additives.

U.S. Pat. No. 4,886,677 to Mitsubishi Kasei Corporation discloses a surface modified meso-erythritol composition, wherein the surface of meso-erythritol is modified with water, non-saccharide sweetening agents, sugar alcohols and/or saccharides. The composition is obtained by mixing meso-erythritol crystal grains and meso-erythritol powders, adding water to the resulting mixture, kneading the mixture, compression-molding the mixture, and drying the resulting molded product.

U.S. Pat. No. 5,080,916 to Mitsubishi Kasei Corporation and Nikken Chemicals Company Limited discloses a sweetening composition that contains microcrystalline meso-erythritol particles whose surface is coated with a sweetening component. The composition is prepared by kneading erythritol with a sweetening component to coat the erythritol.

U.S. Pat. No. 6,030,820 to Mitsubishi Chemical Company discloses a process for producing a high-purity erythritol crystal.

U.S. Pat. Nos. 6,475,552 and 6,559,302 to Shah et al. disclose an edible polysaccharide prepared by reacting a polyol with a saccharide in the presence of mineral acid under anhydrous melt polymerization conditions. The references disclose that the polyol may be erythritol, that the saccharide may be glucose, other simple sugars, hydrolyzed starch and mixtures thereof and that the acid may be malic acid.

U.S. Pat. No. 6,875,460 to SPI Polyols, Inc. discloses a co-crystallized polyol and hydrogenated maltodextrin sweetener. The reference discloses co-melting a polyol, e.g., erythritol, with hydrogenated maltodextrin to form a fully melted mixture. The reference discloses that the resulting mixture has a reduced cooling effect compared to the original polyol.

U.S. Published Application No. 20140342044 to PepsiCo, Inc. discloses a comestible comprising D-psicose and erythritol together with at least one other edible ingredient.

While the sweet taste is pleasant, erythritol has a high negative heat of solution and provides a cooling sensation. Further, the sweet taste is very monochromatic and lacks the flavor complexity of many natural sweeteners. While erythritol's caloric burden is low, the above taste properties are not considered ideal.

Several strategies have been used to overcome erythritol's taste problems. One solution to the negative heat of solution has been to combine erythritol with a material having a positive heat of solution, e.g., fructo-oligosaccharides ("FOS"), inulin and glycerin. Unfortunately, these materials have shortcomings, e.g., inulin and FOS have a propensity to cause gas and bloating when consumed in moderate to large quantities.

Erythritol, which is absorbed into the bloodstream in the small intestine, for the most part is excreted unchanged in the urine. Because erythritol is normally absorbed before it enters the large intestine, it does not normally cause laxative effects as may be experienced after over-consumption of other sugar alcohols.

Erythritol is known to mask bitter and metallic tastes from certain high intensity sweeteners. A well-known example is extracts of the *Stevia rebaudiana* plant. Although the components of the aqueous extracts of this plant, known as steviosides and rebaudiosides, are very sweet (180-300 times sweeter than sucrose), they have metallic and bitter notes. Previously disclosed formulas use small amounts of erythritol to mask the bitter notes in compositions where the primary sweetness is coming from *stevia*.

Stevia

*Stevia rebaudiana bertoni* is a perennial shrub of the Asteraceae (Compositae) family native to certain regions of South America. The leaves of the plant contain from 10 to 20% of diterpene glycosides, which are around 150 to 450 times sweeter than sugar. The leaves have been traditionally used for hundreds of years in Paraguay and Brazil to sweeten local teas and medicines.

Dried *Stevia* leaves are reported to contain approximately 5% to 9% moisture, 10% to 20% protein, 35% to 62% carbohydrates, 3% to 5% fats (principally palmitic, linolenic and linoleic acids), 7% to 13% ash and several volatile components including spathulenol, beta-pinene, beta-caryophyllene, and caryophyllene oxide. *Stevia* is also a rich source of oxalic acid (see Wölwer-Rieck U. The Leaves of *Stevia rebaudiana* (*bertoni*), Their Constituents and the Analysis Thereof: A Review. J. Agric. Chem. 2012, 60, 886-895). These components can affect the flavor aroma of the sweetener if not removed or reduced to a substantially low level. As a result, the isolation of individual high-purity Stevia sweeteners has entailed extensive processing including treatment with various resins, separation using organic solvents, and crystallization to render a product of suitable taste and quality.

At present there are more than 230 Stevia species with significant sweetening properties. The plant has been successfully grown under a wide range of conditions from its native subtropics to the cold northern latitudes. The composition of steviol glycosides can be modified by directed plant breeding. *Stevia rebaudiana* produces a number of steviol glycosides that feature high intensity sweetness and sensory properties, in some cases superior to those of many other naturally occurring high potency sweeteners. Steviol glycosides are not metabolized for energy in the human digestive system, and can be used for sweetening foods without adding calories wherever sugar is used. They are suitable for diabetic and low calorie diets.

The above-mentioned glycosides have a common aglycone, steviol, and differ by the number and type of carbohydrate residues at the C13 and C19 positions. The leaves of *Stevia* are able to accumulate up to 10-20% (on dry weight basis) steviol glycosides. The major glycosides found in native *Stevia* leaves are Rebaudioside A (2-10%), Stevioside (2-10%), and Rebaudioside C (1-2%). Other glycosides, such as Rebaudioside B, D, E, and F, Steviolbioside and Rubusoside, are also found at lower levels (less than 1%).

Two major glycosides—Stevioside and Rebaudioside A, were extensively studied and characterized in terms of their suitability as commercial high intensity sweeteners. For example, stability studies in carbonated beverages confirmed their heat and pH stability. Chang S. S. et al. (1983) Stability studies of Stevioside and Rebaudioside A in carbonated beverages. J. Agric. Food Chem. 31: 409-412. Even in a highly purified state, these steviol glycosides still possess undesirable taste attributes such as bitterness, sweet aftertaste, licorice flavor, etc. One of the main obstacles for the successful commercialization of *Stevia* sweeteners are these undesirable taste attributes. It was shown that these flavor notes become more prominent as the concentration of steviol glycoside increases (Prakash et al. (2008) Development of Rebiana®, a natural, non-caloric sweetener. Food Chem. Toxicol., 46, S75-S82).

Rebaudioside A has shown the least astringent, the least bitter, and the least persistent aftertaste thus possessing favorable sensory attributes as compared to known steviol glycosides (Tanaka O. (1987) Improvement of taste of natural sweeteners. Pure Appl. Chem. 69:675-683; Phillips K. C. (1989) *Stevia*: steps in developing a new sweetener. In: Grenby T. H. ed. Developments in sweeteners, vol. 3. Elsevier Applied Science, London. 1-43).

U.S. Pat. No. 8,277,862 to Concentrate Manufacturing Company of Ireland discloses a beverage product that comprises Rebaudioside A, erythritol and an acid component.

U.S. Patent Application No. 20090004355 to Catani discloses a sweetening composition comprising erythritol and a *stevia* extract.

Brandle et al. (2002) Plant Molecular Biology 50: 613-622; Richman et al. (1999) The Plant Journal 19(4), 411-421; and Richman et al., (2005) The Plant Journal 41, 55-67, disclose metabolic pathways for the production of steviol and the conversion of steviol to various steviol glycosides.

Ohta et al., Characterization of novel steviol glycosides from leaves of *Stevia rebaudiana* morita, J. Appl. Glycosci., 57, 199-209 (2010), discloses the structures of steviol glycosides extracted from leaves of *S. rebaudiana* Morita, which was produced by selection and breeding of *S. rebaudiana bertoni*.

Zimmerman, Tandem mass spectrometric fragmentation patterns of known and new steviol glycosides with structure proposals, Rapid Commun. Mass. Spectrom. 2011, 25, 1575-1582, discloses the use of tandem mass spectrometry to identify 12 previously unknown steviol glycosides.

U.S. Published Application No. 20110183056 to Morita et al. discloses isolated steviol glycosides having the structures disclosed therein. The reference discloses that the steviol glycosides, which have structures which present more glycosidic moieties than on stevioside or Rebaudioside A, may provide a subtle improvement to *Stevia* sweetener taste.

U.S. Published Applications Nos. 20100316782, 20140335253, 20140335254, 20140335264 and 20140335265 to EPC Beijing Natural Products Co. Ltd. disclose non-natural rebaudioside D compositions that contain an increased amount of purified rebaudioside D, wherein the increased amount of purified rebaudioside D is added as purified rebaudioside D to the compositions.

U.S. Pat. No. 8,404,297 to Ingenio del Cauca S.A.—Incauca S.A. discloses a process for co-crystallizing sugar with a natural sweetener product. The process includes a step of adding an antifoaming agent a liquor or syrup to form a sucrose solution.

U.S. Pat. No. 8,591,980 to PureCircle Sdn Bhd discloses a low calorie composite sweetener that contains a high intensity sweetener and a granulate sugar, wherein the surface of the granulate sugar is coated with a layer of the high intensity sweetener.

U.S. Pat. No. 8,790,730 to PureCircle USA discloses a process for producing a low-calorie sweetener composition that includes providing a low intensity sweetener; providing a crystallization inhibitor; dissolving sucrose and the crystallization inhibitor in water to make a solution; purging the solution with nitrogen to obtain a purged sugar solution; providing a high intensity sweetener; dissolving the high intensity sweetener in water to obtain a high intensity sweetener solution; adding the high intensity sweetener solution to the purged sugar solution to obtain a sweetener composition solution; evaporating the sweetener composition solution to obtain a concentrated sweetener composition solution; feeding the concentrated sweetener composition solution to an impact beating apparatus to induce intensive crystallization and residual water evaporation, and to produce free flowing granules of the sweetener composition; and drying the granules to form the low-calorie sweetener composition.

U.S. Published Application No. 20140004248 to LGL Life Tech Corporation discloses a process for producing a natural sweetener composition that contains at least one of a steviolbioside extract, a rebaudioside B extract and a rebaudioside D extract.

U.S. Published Application No. 20140243514 to Cargill, Incorporated discloses a method of preparing an enriched composition of rebaudioside D, rebaudioside D or a mixture thereof that includes the use of a macroporous neutral porous resin.

U.S. Published Application No. 20140377436 to Persinger discloses a low calorie sugar substitute composition that contains a sugar alcohol; a fiber; an oligosaccharide; and a high intensity sweetener.

U.S. Pat. No. 8,414,950 to PureCircle Sdn Bdh discloses a low-calorie table top tablet that contains rebaudioside D, rebaudioside A, stevioside, rebaudioside C, rebaudioside E, rebaudioside F and excipients.

U.S. Pat. No. to PureCircle Sdn Bdh discloses a process for producing a low calorie composite sweetener that contains sugar and high intensity sweeteners that includes adjusting the moisture content of the granulate sugar to 3.0 to 4.0% and use of vibration.

U.S. Pat. No. 4,612,942 discloses diterpene glycosides, including Rebaudioside D, and their use in foodstuffs, medical compositions, oral hygiene compositions, chewing compositions and smoking compositions.

Co-pending U.S. Patent Publication No. 20090104326 to Catani et al. (now abandoned) discloses a solid sweetening composition having erythritol and a secondary sweetener in a single solid matrix. The reference discloses that the solid sweetening composition may be made by: a) heating the erythritol, wherein only enough heat is provided to melt a portion of the erythritol; b) mixing the secondary sweetener into the partially melted erythritol to obtain a mixture; c) cooling the mixture until the mixture is solid; and d) grinding the solid mixture to desired particle size, wherein the erythritol is at least about 50% by weight of the solid sweetening composition. Turbinado sugar is the secondary sweetener used in the examples.

Co-pending U.S. Published Application No. 20090004355 to Catani et al. (now abandoned) discloses the use of *stevia* extracts, including rebaudioside-A, to remove brightness from the taste of erythritol.

Co-pending U.S. Patent Publication No. 20090011104 to Catani et al. (now abandoned) discloses a solid sweetening composition having erythritol and a complex sweetener in a single matrix, wherein the composition is produced by melting erythritol, adding the complex sweetener to the melted erythritol, cooling the mixture and grinding the resulting mass.

U.S. Patent Application No. 20090017185 to Catani et al. (now abandoned) discloses a reduced calorie sweetening composition consisting of a *stevia* extract and a simple sugar. The reference discloses that the *stevia* extract may have a rebaudioside A level of from about 80 wt % to about 99.5 wt % relative to all steviol glycosides and the simple sugar may be sucrose, fructose or glucose.

U.S. Application Serial No. 20100285201 to Catani et al. discloses a synergistic sweetening composition that comprises sucralose and a purified extract of *stevia*, wherein the purified extract of *stevia* comprises rebaudiosides and dulcosides.

U.S. Patent Applications Nos. 20120201952 and 20120201940 to Catani et al. disclose a method of making a natural sweetening composition comprising steam stripping a crude mixture comprising at least one plant based natural high intensity sweetening compound and filtering the crude mixture.

U.S. Application No. 61/941,018 to Catani et al. discloses a comprehensive process for the separation, isolation and characterization of a combination of two or more steviol glycosides from extract of *Stevia rebaudiana* plants and their use in sweetening compositions.

Co-pending U.S. application Ser. No. 14/312,842 to Liao et al. discloses a partial melt co-crystallization composition that contains a crystallizable carrier; and an active. The partial melt co-crystallization compositions are prepared by a method that includes partially melting the crystallizable carrier in an aqueous solution; mixing the active into the partially melted crystallizable carrier to obtain a mixture; and drying the mixture.

Co-pending Ser. No. 62/106772 discloses a zero or low calorie sweetening composition that contains a carrier; luo han go; and a *stevia* plant extract.

What is needed is a low calorie sweetening composition that exhibits a favorable flavor profile for use in consumer products.

SUMMARY OF THE INVENTION

The present invention is directed to a rebaudioside D containing sweetener composition comprising, consisting of and/or consisting essentially of erythritol, sugar, rebaudioside D, and rebaudioside A.

Figure 2:
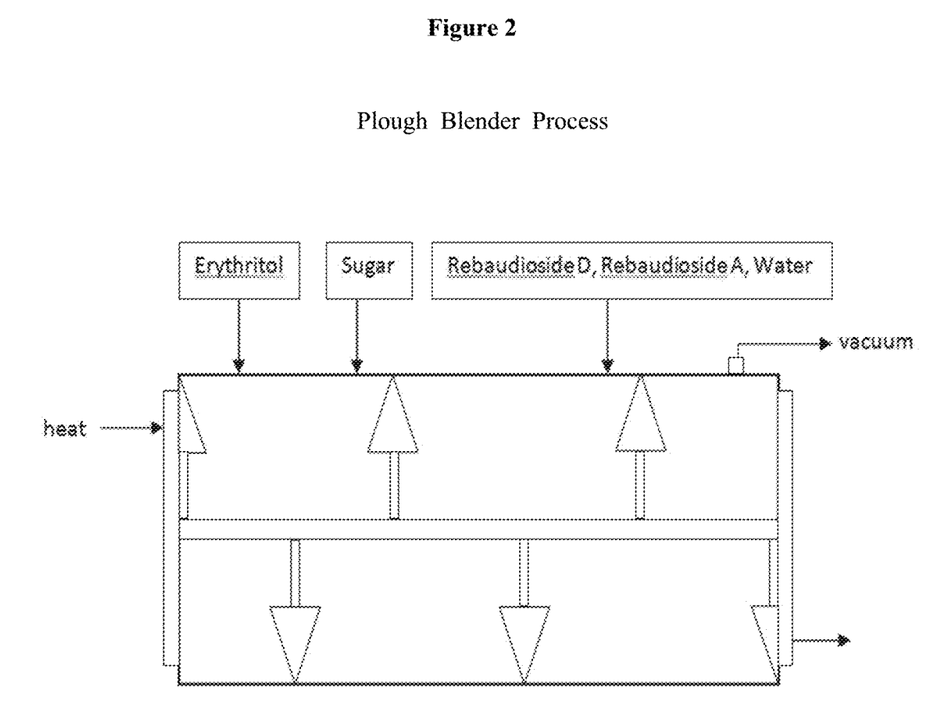
FIG. 2 is one method for manufacture.

The present invention is further directed to a method for producing the rebaudioside D containing sweetener composition comprising, consisting of and/or consisting essentially of erythritol, sugar, rebaudioside D, and rebaudioside A, wherein the method comprises, consists of and/or consists essentially of a partial melt co-crystallization obtained by adding a suspension of rebaudioside D, rebaudioside A, and water to a blend of erythritol and crystalline sugar with mixing and heat to produce a partial melting of the crystal surface allowing the rebaudioside D and rebaudioside A to become embedded and recrystallized within erythritol/sugar blend. Shown in FIG. 2.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The accompanying drawings, which are incorporated in and constitute a part of this specification, illustrate embodiments of the invention, and together with the description, explain the principles of the invention. In the drawings:

FIG. 1 is SPI Polyols, Inc. Polyols Comparison Chart.

DETAILED DESCRIPTION OF THE INVENTION

It is believed that one skilled in the art can, based upon the description herein, utilize the present invention to its fullest extent. The following specific embodiments are to be construed as merely illustrative, and not as limiting the remainder of the disclosure in any way whatsoever.

Unless defined otherwise, all technical and scientific terms used herein have the same meaning as commonly understood by one of ordinary skill in the art to which the invention belongs. Also, all publications, patent applications, patents, and other references mentioned herein are incorporated by reference. As used herein, all percentages are by weight unless otherwise specified. In addition, all ranges set forth herein are meant to include any combinations of values between the two endpoints, inclusively.

Definitions

As used herein, the term "active" means a substance in a consumer product that is biologically active.

By the term "flavor notes" it is meant subtle sensory aspects typically detected by taste, or smell experienced while exhaling through the nose after ingestion (retronasal olfaction).

As used herein, the term "crystallizable carrier" means a substance that is able to form solid crystals and that facilitates the transport of an active. Preferred crystallizable carriers are sugars and sugar alcohols. A more preferred crystallizable carrier is sugar (sucrose). Additional carriers include erythritol.

As used herein, a "food-grade" material is one that conforms to the standards for foods deemed safe for human consumption set forth in the Codex Alimentarius produced by the World Health Organization (1999).

Suitable "high-intensity sweeteners" include chemical compounds or mixtures of compounds, which elicit a sweet taste at least five times sweeter than sucrose, as measured in accordance with the test method described in G.B. Patent No. 1,543,167, which is incorporated by reference herein. Typically such sweeteners are substantially free from degradants after being heated for about one hour at about 40° C. Examples of such suitable sweeteners include, but are not limited to, sucralose, neotame, saccharin, acesulfame-K, cyclamate, neohesperdine DC, stevia, thavmatin, brazzein, aspartame, and mixtures thereof.

Examples of natural high intensity sweeteners include steviol glycosides, some mogrosides (for example, Mogroside V), brazzein, neohesperidin dihydrochalcone (NHDC), glycyrrhizic acid and its salts, thaumatin, perillartine, pernandulcin, mukuroziosides, baiyunoside, phlomisoside-I, dimethyl-hexahydrofluorene-dicarboxylic acid, abrusosides, periandrin, carnosiflosides, cyclocarioside, pterocaryosides, polypodoside A, brazilin, hernandulcin, phillodulcin, glycyphyllin, phlorizin, trilobatin, dihydroflavonol, dihydroquercetin-3-acetate, neoastilibin, trans-cinnamaldehyde, monatin and its salts, selligueain A, hematoxylin, monellin, osladin, pterocaryoside A, pterocaryoside B, mabinlin, pentadin, miraculin, curculin, neoculin, chlorogenic acid, cynarin, siamenoside and others.

Stevia is a non-caloric natural sweetener from the plant Stevia rebaudiana. The plant makes a number of sweet compounds collectively referred to as steviol glycosides, which make stevia up to 300 times sweeter than sucrose. These glycosides can be extracted from the plant with water and other solvents well known to those skilled in the art. They are heat stable, pH stable, do not ferment, and do not induce a glycemic response.

As used herein "stevia extract" means a sweet glycoside extracted from a stevia plant.

By the term "steviol" it is meant the diterpenoic compound hydroxy-ent-kaur-16-en-13-ol-19-oic acid, which is the hydroxylated form of the compound termed "ent-kaurenoic acid," which is ent-kaur-16-en-19-oic acid.

By the term "steviol glycoside" it is meant any of the glycosides of the aglycone steviol including, but not limited to, stevioside, Rebaudioside A, Rebaudioside B, Rebaudioside C, Rebaudioside D, Rebaudisode E, Rebaudisode F, Rebaudioside I, Rebaudiouside M, Rebaudioside N, Rebaudioside O, dulcoside, rubusoside, steviolmonoside, steviolbioside, and 19-O-β-glucopyranosyl-steviol.

Examples of "synthetic sweeteners" include sucralose, potassium acesulfame, aspartame, alitame, saccharin, neohesperidin dihydrochalcone synthetic derivatives, cyclamate, neotame, dulcin, suosan, N-[N-[3-(3-hydroxy-4-methoxyphenyl)propyl]-L-α-aspartyl]-L-phenylalanine 1-methyl ester (Advantame), N-[N-[3-(3-hydroxy-4-methoxyphenyl)-3-methylbutyl]-L-α-aspartyl]-L-phenyl-alanine 1-methyl ester, N-[N-[3-(3-methoxy-4-hydroxyphenyl)propyl]-L-α-aspartyl]-L-phenylalanine 1-methyl ester, salts thereof, and the like.

As used herein the term "partially dissolved crystallizable carrier" (or "partially melted crystallizable carrier") means a composition, with or without other ingredients or components that has been dissolved part of the crystallizable carrier to provide a slurry of dissolved and solid crystallizable carrier. A preferred range for dissolving is about 3% to about 60% by weight of the crystallizable carrier. A preferred range for dissolving for a low active load is about 3% to about 30% by weight of the crystallizable carrier. A preferred range for dissolving for a high active load is about 20 to about 40% by weight of the crystallizable carrier.

As used herein, the term "pharmaceutical active" means the substance in a pharmaceutical drug that is biologically active.

The pharmaceutical active may be a pharmaceutical active for immediate or sustained release. Such pharmaceutical active may be formulated for immediate release upon ingestion, for sustained release, for release in the colon, or any combination thereof.

The pharmaceutical active may be an antihistamine, a decongestant, an analgesic, an anti-inflammatory, an antipyretic, a cough suppressant, an expectorant, or any other pharmaceutical active or combination of such pharmaceutical actives.

Examples of antihistamines and decongestants, include, but are not limited to, bromopheniramine, chlorcyclizine, dexbrompheniramine, bromhexane, phenindamine, pheniramine, pyrilamine, thonzylamine, pripolidine, ephedrine, pseudoephedrine, phenylpropanolamine, chlorpheniramine, dextromethorphan, diphenhydramine, doxylamine, astemizole, terfenadine, fexofenadine, naphazoline, oxymetazoline, montelukast, propylhexadrine, triprolidine, clemastine, acrivastine, promethazine, oxomemazine, mequitazine, buclizine, bromhexine, ketotifen, terfenadine, ebastine, oxatamide, xylomeazoline, loratadine, desloratadine, and cetirizine; isomers thereof, and pharmaceutically acceptable salts and esters thereof.

Examples of suitable analgesics, anti-inflammatories, and antipyretics include, but are not limited to, non-steroidal anti-inflammatory drugs (NSAIDs) such as propionic acid derivatives (e.g., ibuprofen, naproxen, ketoprofen, flurbiprofen, fenbufen, fenoprofen, indoprofen, ketoprofen, fluprofen, pirprofen, carprofen, oxaprozin, pranoprofen, and suprofen) and COX inhibitors such as celecoxib; acetaminophen; acetyl salicylic acid; acetic acid derivatives such as indomethacin, diclofenac, sulindac, and tolmetin; fenamic acid derivatives such as mefanamic acid, meclofenamic acid, and flufenamic acid; biphenylcarbodylic acid derivatives such as diflunisal and flufenisal; and oxicams such as piroxicam, sudoxicam, isoxicam, and meloxicam; isomers thereof, and pharmaceutically acceptable salts and prodrugs thereof.

Examples of cough suppressants and expectorants include, but are not limited to, diphenhydramine, dextromethorphan, noscapine, clophedianol, menthol, benzonatate, ethylmorphone, codeine, acetylcysteine, carbocisteine, ambroxol, belladona alkaloids, sobrenol, guaiacol, and guaifenesin; isomers thereof, and pharmaceutically acceptable salts and prodrugs thereof.

Additional examples of actives include eucalyptol, menthol, methyl salicyate and thymol.

Preferred actives include heat sensitive and/or moisture sensitive actives.

As used herein, a gram (or other given amount) of Sucrose Equivalent Sweetness ("SES") means the amount of high intensity sweetener needed to be added to an 8 ounce glass of water in order to provide the same sweetness as an independent 8 ounce glass of water containing one gram (or the other given amount) of sucrose. For example, 1/200 g of aspartame will equal about one gram of SES because aspartame is about 200 times sweeter than sucrose. Similarly, about 1/500 g to about 1/600 g of sucralose will provide one gram of SES because sucralose is about 500 to about 600 times sweeter than sucrose.

As used herein, the term "sugar alcohol" means a food-grade alcohol derived from a sugar molecule. Sugars and Sugar alcohols useful in the present invention include, for example, dextrose, fructose, isomalt, erythritol, hydrogenated isomaltulose, hydrogenated starch hydrolyzates, lactitol, maltitol, mannitol, polydextrose, D-psicose, sorbitol, sucrose, tagatose, trehalose, xylitol, and combinations thereof.

As used herein, all numerical ranges provided are intended to expressly include at least all numbers that fall between the endpoints of ranges.

The compositions contemplated herein can contain other sweeteners, sugars, sweet enhancers, fibers or nutritional components that are stable under partial melt conditions. The compositions of the present invention may contain additional non-sweetening ingredients as well, including flavors, aromas, other nutritional components, and mixtures thereof. For example the compositions can contain fiber(s), vitamin(s), mineral(s), and/or herbal supplement(s).

As used herein, unless otherwise indicated, the term "flavor" means any food-grade material that may be added to the present compositions to provide a desired flavor. Flavors useful in the present invention include, for example, cream, hazelnut, vanilla, chocolate, cinnamon, pecan, lemon, lime, raspberry, peach, mango, vanillin, butter, butterscotch, tea, orange, tangerine, caramel, strawberry, banana, grape, plum, cherry, blueberry, pineapple, elderberry, watermelon, bubblegum, cantaloupe, guava, kiwi, papaya, coconut, mint, spearmint, derivatives, and combinations thereof.

As used herein, unless otherwise indicated, the term "aroma component" means any food-grade volatile substance that may be employed to produce a desired scent, for example, when mixed with a foodstuff. Aromas useful in the present invention include, for example, essential oils (citrus oil), expressed oils (orange oil), distilled oils (rose oil), extracts (fruits), anethole (liquorice, anise seed, ouzo, fennel), anisole (anise seed), benzaldehyde (marzipan, almond), benzyl alcohol (marzipan, almond), camphor (cinnamomum camphora), cinnamaldehyde (cinnamon), citral (citronella oil, lemon oil), d-limonene (orange) ethyl butanoate (pineapple), eugenol (clove oil), furaneol (strawberry), furfural (caramel), linalool (coriander, rose wood), menthol (peppermint), methyl butanoate (apple, pineapple), methyl salicylate (oil of wintergreen), neral (orange flowers), nerolin (orange flowers), pentyl butanoate (pear, apricot), pentyl pentanoate (apple, pineapple), sotolon (maple syrup, curry, fennugreek), strawberry ketone (strawberry), substituted pyrazines, e.g., 2-ethoxy-3-isopropylpyrazine; 2-methoxy-3-sec-butylpyrazine; and 2-methoxy-3-methylpyrazine (toasted seeds of fenugreek, cumin, and coriander), thujone (juniper, common sage, Nootka cypress, and wormwood), thymol (camphor-like), trimethylamine (fish), vanillin (vanilla), and combinations thereof. Preferred aroma components according to the present invention include, essential oils (citrus oil), expressed oils (orange oil), distilled oils (rose oil), extracts (fruits), benzaldehyde, d-limonene, furfural, menthol, methyl butanoate, pentyl butanoate, salts, derivatives, and combinations thereof.

The aroma component may be present in any amount in the composition. Preferably, the aroma component is present in an amount from about 2- to about 10-times the detectable amount. More preferably, the aroma component is present in an amount from about 2- to about 5-times the detectable amount. As used herein, unless otherwise indicated, the term "detectable amount" is the amount of the aroma component required to produce a scent detectable in the foodstuff.

The compositions of the present invention have energy contents less than that of a nutritive sugar, preferably less than 5 calories per serving.

As a sweetener, the composition can be packaged in packets, as a bulk sweetener, as a liquid, in cubes, or any normal sugar forms.

As a pharmaceutical, the composition can be any solid object, semi-solid, or liquid-filled composition designed to contain a specific pre-determined amount (dose) of a pharmaceutical active.

The following examples are provided to further illustrate the compositions and methods of the present invention. These examples are illustrative only and are not intended to limit the scope of the invention in any way.

Though, with plethora of no or low calorie sweeteners on the market, many of these products lack desirable sensory profile and exhibit off-taste and/or bitterness. Achieving favorable sensory attributes in targeted applications is a must have quality to ensure maximum consumer acceptance for product successes. For example, in beverage applications, favorable sensory attributes include, but not limited to, sweetness quality, lack of off-taste and bitterness, sugar-like taste and sugar-like mouth-feel.

The present invention is directed to an innovative solution to the above mentioned quality challenges with a systematically designed no-calorie or low-calorie sweeteners providing desirable sensory characteristics profile comparable to sugar, especially, with an improved mouth feel and sugar-like taste in beverage applications. Importantly, both liquid and dry forms of the present sweetener compositions are suitable for applications in beverages, nutritional products, dietary supplements and Rx/OTC products. Both liquid and dry compositions of the present invention are ideal for use as tabletop sugar substitutes.

EXAMPLE

The acceptance of a formula with high Rebaudioside-D content was assessed by comparing the formula below to a known commercial formula. Rebaudioside D/Rebaudioside-A blends with erythritol and sugar (equivalent to 2 teaspoon of sugar, no calorie sweetener) having the formula in Table 2 were compared to Commercial Product in coffee, in iced tea and direct taste.

TABLE 2

| Sweetness Equivalent to 1 teaspoon of Sugar | |
|---|---|
| Ingredient | % |
| Sugar | 0-99 |
| Erythritol | 0-99 |
| Rebaudioside-D | 0.05-2.5 |
| Rebaudioside-A | 0-1.25 |
| TOTAL | 100.00 |

TABLE 3

| Sweetness Equivalent to 2 teaspoons of Sugar | |
|---|---|
| Ingredient | % |
| Sugar | 30-70 |
| Erythritol | 30-70 |
| Rebaudioside-D | 0.05-2 |
| Rebaudioside-A | 0.01-0.08 |
| TOTAL | 100.00 |

Sample Preparation
1. Set up a hot water bath at 85° C. (185° F.) with water depth about 1.5 inches.
2. Add sugar and erythritol to a 250 ml beaker and stir to combine.
3. Add 1.0 gm. of bottled water to a 400 ml. beaker.
4. Add Rebaudioside D and Rebaudioside A to the water in the beaker and stir to combine.
5. Add the sugar and erythritol mixture to the 400 ml. beaker containing the liquid solution and begin stirring vigorously with a whisk.
6. Place the beaker into the hot water bath and continue stirring until the product is dry and lump free. (There will be a visual change in consistency and the product will become free flowing.)
7. Dispense 0.20 gms. into plastic sample cups and seal.

Example of a Partial Melt Co-Crystallization Process
1. Supply heat to the jacket of a plough blender (85° C./185° F.)
2. Prepare a suspension of 1.594 lbs. (0.723 kg) Rebaudioside D, 0.050 lbs. (0.023 kg) Rebaudioside A, and 2.498 lbs. (1.133 kg.) of water.
3. Add 60.856 lbs. (27.604 kg.) of sugar to the blender.
4. Add 62.500 lbs. (28.350 kg.) of erythritol to the blender.
5. Start mixer at full speed.
6. Add 4.142 lbs. (1.879 kg.) of the Reb D/Reb A/water suspension to the mixer while it is running. Turn on vacuum to maximum setting (>22 in. Hg) and begin drying.
7. Stop at intervals during blending to open the mixer and look at consistency of material.
8. Blend until material appears dry. (non-clumping)
9. Remove a sample from the blender and analyze for moisture content.
10. Continue drying until moisture is <0.2%.
11. Continue drying if required and re-sample for moisture content.
12. Once dry, discharge batch into container below the mixer.

Sensory Testing

For sensory evaluations, the following samples were prepared:
1. Sugar/Erythritol/Stevia (Rebaudioside-D/Rebaudioside-A blend)
2. Commercial Product with Stevia Sensory Methodology Panelists evaluated the samples in a monadic sequential manner and completed a self-administered questionnaire on computer. Order of presentation was randomized and balanced. Approximately 50-60 respondents participated in each sensory test. Respondents received 2-3 oz. of beverage for their evaluation. Panelists were asked to cleanse their palate between evaluation with unsalted crackers and water.

Panelists were asked to rate each sample for overall liking, amount of sweetness, bitterness intensity and aftertaste. Panelists were also asked to indicate if they agree or disagree with each phrase: Tastes like sugar, Has a clean taste like sugar, Has no unpleasant aftertaste.

Coffee
Sugar/Erythritol/Stevia (Rebaudioside-D/Rebaudioside-A Blend) Formula Versus Commercial Product with Stevia
N=51

| | Sugar/Erythritol/Stevia (Rebaudioside-D/Rebaudioside-A blend) Formula | Commercial Product with Stevia | Significant Differences |
|---|---|---|---|
| Overall Liking | 5.88 | 4.92 | 95% |
| Amount of Sweetness | 3.08 | 2.73 | 90% |
| Bitterness Intensity | 1.78 | 2.20 | 95% |
| Tastes Like Sugar | Agree = 66.7% Disagree = 33.3% | Agree = 37.3% Disagree = 62.8% | 95% |
| Has a Rich Sweet Taste of Sugar | Agree = 60.8% Disagree = 39.2% | Agree = 35.3% Disagree = 64.7% | 95% |
| Has No Unpleasant Aftertaste | Agree = 72.6% Disagree = 27.5% | Agree = 56.9% Disagree = 43.1% | 90% |
| Presence of Aftertaste | Yes = 39.2% No = 60.8% | Yes = 54.9% No = 45.1% | 95% |
| Bitter Aftertaste | 1.80 | 2.32 | 95% |

Iced Tea
Sugar/Erythritol/Stevia (Rebaudioside-D/Rebaudioside-A Blend) Formula Versus Commercial Product with Stevia
N=56

| | Sugar/Erythritol/Stevia (Rebaudioside-D/Rebaudioside-A blend) Formula | Commercial Product with Stevia | Significant Differences |
|---|---|---|---|
| Overall Liking | 6.11 | 4.46 | 95% |
| Amount of Sweetness | 2.98 | 3.02 | NSD |
| Bitterness Intensity | 1.27 | 1.57 | 95% |
| Tastes Like Sugar | Agree = 71.4% Disagree = 28.6% | Agree = 39.3% Disagree = 60.7% | 95% |
| Has a Rich Sweet Taste of Sugar | Agree = 71.4% Disagree = 28.6% | Agree = 33.9% Disagree = 66.1% | 95% |
| Has No Unpleasant Aftertaste | Agree = 82.1% Disagree = 17.9% | Agree = 58.9% Disagree = 41.1% | 90% |
| Presence of Aftertaste | Yes = 28.6% No = 71.4% | Yes = 48.2% No = 51.8% | 90% |
| Bitter Aftertaste | 1.44 | 1.81 | 95% |

Direct Taste
Sugar/Erythritol/*Stevia* (Rebaudioside-D/Rebaudioside-A Blend) Formula versus Commercial Product with *Stevia*
N=58

|  | Sugar/Erythritol/Stevia (Rebaudioside-D/Rebaudioside-A blend) Formula | Commercial Product with Stevia | Significant Differences |
| --- | --- | --- | --- |
| Overall Liking | 6.97 | 5.31 | 95% |
| Amount of Sweetness | 3.03 | 3.33 | 95% |
| Bitterness Intensity | 1.21 | 1.69 | 95% |
| Tastes Like Sugar | Agree = 84.5% Disagree = 15.5% | Agree = 50.0% Disagree = 50.0% | 95% |
| Has a Rich Sweet Taste of Sugar | Agree = 75.9% Disagree-24.1% | Agree = 53.5% Disagree = 46.5% | 95% |
| Has No Unpleasant Aftertaste | Agree = 82.8% Disagree = 17.2% | Agree = 63.8% Disagree = 36.2% | 95% |
| Presence of Aftertaste | Yes = 20.7% No = 79.3% | Yes = 46.5% No = 53.5% | 95% |
| Bitter Aftertaste | 1.83 | 1.96 | NSD |

Conclusions
Sugar/Erythritol/*Stevia* (Rebaudioside-D/Rebaudioside-A Blend) Formula Versus Commercial Product with *Stevia*

Based on evaluations, Sugar/Erythritol/*Stevia* (Rebaudioside-D/Rebaudioside-A Blend), (packet=formulated at 2 teaspoon of sugar) performed significantly better than Commercial Product in all three applications.

Sugar/Erythritol/*Stevia* (Rebaudioside-D/Rebaudioside-A Blend) was rated significantly higher than Commercial Product with *stevia* for Overall Liking in coffee/iced tea and direct taste.

Sugar/Erythritol/*Stevia* (Rebaudioside-D/Rebaudioside-A Blend) formula was significantly lower in "Bitterness Intensity" versus Commercial Product with *stevia* in coffee/iced tea and direct taste.

Significantly more panelists found that Sugar/Erythritol/*Stevia* (Rebaudioside-D/Rebaudioside-A Blend) formula: Tastes Like Sugar" versus Commercial *Stevia* Product in coffee/iced tea and direct taste.

Significantly more panelists found that Sugar/Erythritol/*Stevia* (Rebaudioside-D/Rebaudioside-A Blend) formula "Has A Rich Sweet Taste of Sugar" versus commercial *stevia* product in coffee/iced tea and direct taste.

Significantly fewer panelists "perceived an aftertaste" in Sugar/Erythritol/*Stevia* (Rebaudioside-D/Rebaudioside-A Blend) formula versus commercial *stevia* product in coffee/iced tea and direct taste.

Significantly more panelists found (90%) that Rebaudioside-D: Rebaudioside-A blend "Has No Unpleasant Aftertaste" versus commercial *stevia* product in coffee/iced tea and direct taste.

Significantly more people found that Sugar/Erythritol/*Stevia* (Rebaudioside-D/Rebaudioside-A Blend) formula "Has No Bitter Aftertaste" versus commercial *stevia* product in coffee and iced tea.

The foregoing examples are not intended to limit the scope of the present invention, which may be set out in the claims. In particular, various equivalents and substitutions will be recognized by those skilled in the art in view of the foregoing disclosure and these are contemplated to be within the scope of the invention.

The invention claimed is:

1. A sweetening composition consisting essentially of:
a blend of erythritol, sugar, rebaudioside A, and rebaudioside D,
wherein the rebaudioside A is present in an amount ranging from about 0.01% to about 1.25% by weight of the total composition;
wherein the rebaudioside D is present in an amount ranging from 0.05% to about 2.5% by weight of the total composition;
wherein the rebaudioside D and rebaudioside A are present in a 97:3 ratio by weight percent; and
wherein the rebaudioside D and rebaudioside A are embedded and recrystallized within a blend of the erythritol and sugar.

2. The sweetening composition of claim 1, further comprising a flavor material selected from the group consisting of cream, hazelnut, vanilla, chocolate, cinnamon, pecan, lemon, lime, raspberry, peach, mango, vanillin, butter, butterscotch, tea, orange, tangerine, caramel, strawberry, banana, grape, plum, cherry, blueberry, pineapple, elderberry, watermelon, bubblegum, cantaloupe, guava, kiwi, papaya, coconut, mint, spearmint, derivatives, and combinations thereof.

3. The sweetening composition of claim 1, further comprising an aroma component in an amount from about 2 to about 10 times the detectable amount.

4. The sweetening composition of claim 3, wherein the aroma component is selected from the group consisting of essential oils, expressed oils, distilled oils, extracts, anethole, anisole, benzaldehyde, benzyl alcohol, camphor, cinnamaldehyde, citral, d-limonene, ethyl butanoate, eugenol, furaneol, furfural, linalool, menthol, methyl butanoate, methyl salicylate, neral, nerolin, pentyl butanoate, pentyl pentanoate, sotolon, strawberry ketone, substituted pyrazines, e.g., 2-ethoxy-3-isopropylpyrazine; 2-methoxy-3-sec-butylpyrazine; and 2-methoxy-3-methylpyrazine, thuj one, thymol, trimethylamine, vanillin, and combinations thereof.

5. The sweetening composition of claim 1, further comprising coloring selected from the group consisting of annatto extract, caramel, grape skin extract, paprika, riboflavin, turmeric, fruit or vegetable juices, FD&C red, yellow or blue colors.

6. The sweetening composition of claim 1, further comprising an active, wherein the active is a pharmaceutical active selected from the group consisting of eucalyptol, menthol, methyl salicylate, and thymol.

7. The sweetening composition of claim 1, wherein the composition has an energy content less than that of a nutritive sugar.

8. The sweetening composition of claim 1, wherein the composition exhibits improved sensory characteristics relative to commercial *stevia* product, the characteristics including decreased perception of off-taste and bitterness, more sugar-like taste and more sugar-like mouth feel.

9. The sweetening composition of claim 1, wherein the composition has an energy content of less than 5 calories per every 1 gram SES.

\* \* \* \* \*